(12) United States Patent
Willems

(10) Patent No.: US 9,479,039 B2
(45) Date of Patent: Oct. 25, 2016

(54) ELECTRIC DAMPER FOR A MOTOR VEHICLE

(75) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 397 days.

(21) Appl. No.: 13/818,038

(22) PCT Filed: Aug. 4, 2011

(86) PCT No.: PCT/EP2011/003898
§ 371 (c)(1),
(2), (4) Date: Feb. 20, 2013

(87) PCT Pub. No.: WO2012/031650
PCT Pub. Date: Mar. 15, 2012

(65) Prior Publication Data
US 2013/0154404 A1    Jun. 20, 2013

(30) Foreign Application Priority Data
Aug. 21, 2010   (DE) .................. 10 2010 035 084

(51) Int. Cl.
| | |
|---|---|
| H02K 35/00 | (2006.01) |
| H02K 35/04 | (2006.01) |
| F16F 15/03 | (2006.01) |
| B60G 13/14 | (2006.01) |
| F16F 9/12 | (2006.01) |
| H02K 7/18 | (2006.01) |
| H02K 16/00 | (2006.01) |

(52) U.S. Cl.
CPC .............. *H02K 35/04* (2013.01); *B60G 13/14* (2013.01); *F16F 9/12* (2013.01); *F16F 15/03* (2013.01); *F16F 15/035* (2013.01); *H02K 7/1892* (2013.01); *H02K 35/00* (2013.01); *B60G 2300/60* (2013.01); *H02K 16/005* (2013.01)

(58) Field of Classification Search
USPC ...... 188/167, 902; 310/36–37, 266, 83, 115, 310/118; 322/3; 180/902; 280/5.5, 5.507, 280/5.508, 5.509, 5.513, 5.515
See application file for complete search history.

(56) References Cited

U.S. PATENT DOCUMENTS

| | | | |
|---|---|---|---|
| 3,343,017 A | 9/1967 | Pop | |
| 4,032,829 A * | 6/1977 | Schenavar | ................. 322/3 |
| 5,053,662 A | 10/1991 | Richter | |
| 5,060,959 A * | 10/1991 | Davis et al. | ............ 280/5.514 |
| 5,912,519 A | 6/1999 | Horner et al. | |
| 6,278,196 B1 | 8/2001 | Ehrhart et al. | |
| 6,425,839 B1 * | 7/2002 | Koelle et al. | ............ 475/149 |
| 7,230,363 B2 * | 6/2007 | Stout et al. | ......... H02K 19/38 |
| | | | 310/112 |
| 7,411,330 B2 * | 8/2008 | Kaneko | ................... 310/266 |

(Continued)

FOREIGN PATENT DOCUMENTS

| | | |
|---|---|---|
| CN | 1158674 | 9/1997 |
| CN | 101804774 | 8/2010 |

(Continued)

*Primary Examiner* — Burton Mullins
(74) *Attorney, Agent, or Firm* — Henry M. Feiereisen LLC.

(57) ABSTRACT

An electric damper for a vehicle for damping a relative motion between two components includes an electrical generator, which can be driven by the relative motion, for generating an induced voltage. Said electrical generator has a stator, a rotor, and associated induction windings and field magnets. According to the invention, the rotor is designed as a two-part rotor, comprising an inner, stationary iron core and a radially outer hollow wheel, which carries the induction windings or the field magnets.

14 Claims, 3 Drawing Sheets

(56) References Cited

U.S. PATENT DOCUMENTS

| | | | |
|---|---|---|---|
| 8,183,802 B2* | 5/2012 | Quere | 318/269 |
| 8,283,795 B2* | 10/2012 | Khoury et al. | 290/1 R |
| 2005/0104472 A1* | 5/2005 | Mantovani | B60K 7/0007 |
| | | | 310/266 |
| 2010/0207309 A1 | 8/2010 | Park | |
| 2013/0049508 A1* | 2/2013 | Willems | B60G 7/001 |
| | | | 310/105 |

FOREIGN PATENT DOCUMENTS

| | | | | |
|---|---|---|---|---|
| DE | 29 03 295 | | 7/1980 | |
| DE | 39 25 959 | | 2/1991 | |
| DE | 101 15 858 | | 10/2002 | |
| EP | 0 926 806 | | 6/1999 | |
| WO | 2011042085 | * | 4/2011 | F16F 15/03 |

* cited by examiner

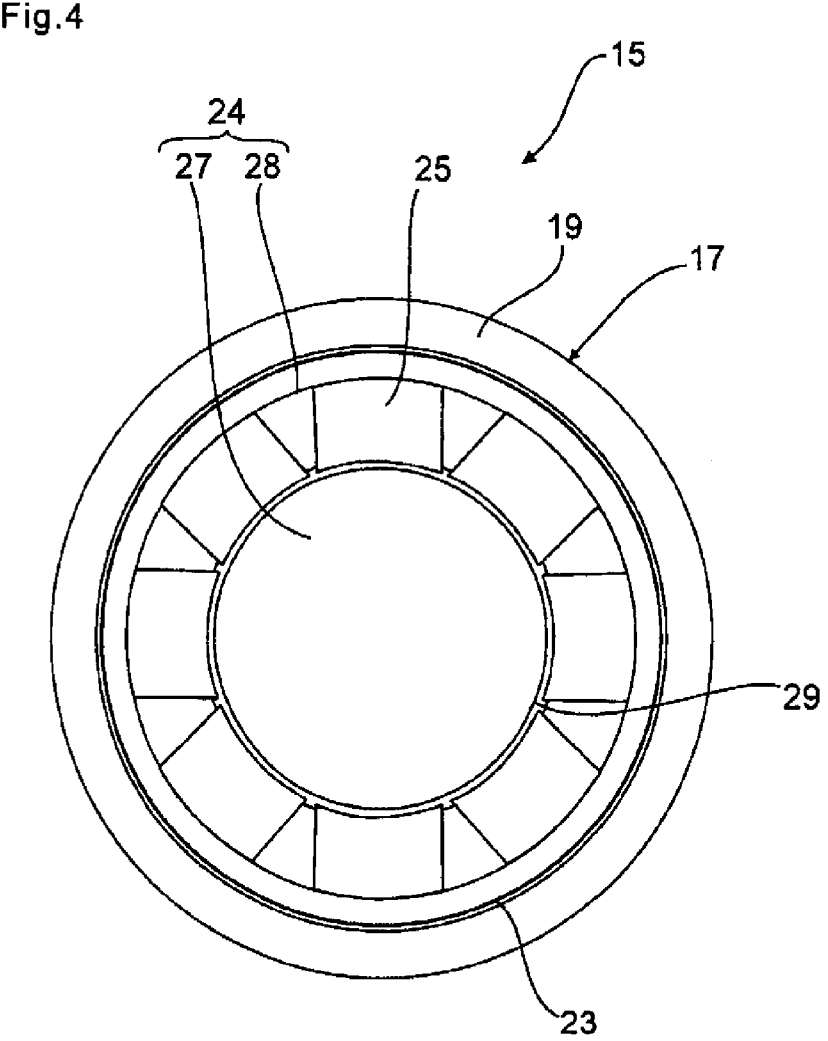

ELECTRIC DAMPER FOR A MOTOR VEHICLE

CROSS-REFERENCES TO RELATED APPLICATIONS

This application is the U.S. National Stage of International Application No. PCT/EP2011/003898 filed Aug. 4, 2011, which designated the United States and has been published as International Publication No. WO 2012/031650 A1 and which claims the priority of German Patent Application, Serial No. 10 2010 035 084.2, filed Aug. 21, 2010, pursuant to 35 U.S.C. 119(a)-(d).

BACKGROUND OF THE INVENTION

The invention relates to an electric damper, in particular for a motor vehicle according to the preamble of patent claim 1.

Such a damper can be used instead of an oscillating mechanical system of a motor vehicle. Like the hydraulic damper, the electric damper also withdraws energy from the vibratory system. However, the energy is not converted into thermal energy but rather, a generator which is assigned to the electric damper is driven with the vibration energy and converts the vibration energy into electric energy which is fed into the electrical system of the motor vehicle.

From DE 101 15 858 A1, a generic electric damper for a motor vehicle is known which is capable of damping a relative movement between two components. The electric damper has an electrical generator for generating an induction voltage and can be driven by means of the relative movement between the two components. As known per se, the generator has a stator, a rotor and associated induction windings as well as field magnets whereby induction voltage is generated.

In conventional generators, the stationary stator carries the induction windings while the rotating rotor carries the permanent magnets or as an alternative electromagnets which can be activated by an exciting current. The rotor is configured as a solid iron part in order to increase the magnetic flow and to homogenize the magnetic field. The configuration of the rotor as solid iron part leads to an increased mass moment of inertia of the rotor which depending on the intended application of the generator is associated with advantages or disadvantages and is thus an important characteristic of generators.

Particularly in highly dynamic applications such as in the present vibration damping of two components, the forces resulting from the mass moment of inertia limit the component size which is a limiting factor for the design of the electric damper.

The object of the invention is to provide an electric damper for damping a relative movement between two components which also operates consistently safe in highly dynamic damping processes.

SUMMARY OF THE INVENTION

The object is solved by an electric damper for a vehicle for damping a relative movement between two components with an electrical generator for generating an induction voltage, which can be driven by the relative movement, wherein the generator has a stator, a rotor and associated induction windings and field magnets, wherein the rotor is configured two-part with an inner, stationary iron core and a radially outer hollow wheel which carries the induction windings or the field magnets. Preferred refinements of the invention are disclosed in the sub claims.

The rotor is configured two-part with an inner, stationary iron core and with a radially outer hollow wheel which carries the induction windings or the field magnets of the generator. According to the invention, an iron core is thus still provided for the rotor. However, this iron core is decoupled from the rotational movements of the rotating hollow wheel of the rotor. The mass of the iron core does thus no longer contribute to the mass moment of inertia of the rotor which lowers the mass forces during dynamic operation of the generator. The mass moment of inertia of the rotor, reduced according to the invention, thus results in a lower proportion of mass forces during dynamic operation in the overall output moment of the generator.

Preferably, the generator can be a so called inner-pole generator. In such a generator, the induction windings are located outside in the stator while the field magnets are located at the hollow wheel of the rotor. This design has the advantage that the induction current produced in the stator can be directly collected at fixed clamps. The field magnets that interact with the induction windings can be configured as permanent magnets or as electromagnets. However, the configuration as electromagnets which can be activated by a relatively small exciting current is preferred.

In order to achieve a rotational movement of the rotor ring gear that is as frictionless as possible, the stationary iron core is spaced apart from the radially outer ring gear via a free annular gap. In a particularly simple embodiment, the free annular gap can be an air gap. For increasing the magnetic flow, the width of the annular gap is to be configured correspondingly small. For a further increase of the magnetic flow on the other hand, it is advantageous when the above mentioned free annular gap between the iron core and the rotor ring gear is filled with a fluid. In dual function, the highly permeable fluid leads to an increase of the magnetic flow and at corresponding viscosity to an additional damping of the relative movement between the two components.

For a compact design of the damper, the ring gear of the rotor can be a rotationally symmetric, cylindrical hollow body, one of whose front sides transitions into a drive shaft. The drive shaft thus drives the rotor ring gear. For this, the drive shaft is directly or indirectly movably coupled with one or both components in order to drive the rotor ring gear as a result of the relative movement of the components. The opposing front side of the rotor ring gear on the other hand is configured open so that the stationary iron core can protrude into the hollow space of the ring gear.

In a constructively simple manner, the iron core which is arranged in the ring gear can be directly fixed on a front-side support wall of the stator. For reducing the number of components and for a compact configuration, it is advantageous when the stator together with the iron core forms a one-piece component. Beside the above mentioned front-side support wall, the stator has a hollow, cylindrical circumferential wall, on the inside of which the induction windings can be supported. The hollow, cylindrical circumferential wall of the stator together with the radially inner arranged iron core is formed rotationally symmetrical around an imaginary cylinder axis of the component, wherein the radially inner iron core is spaced apart from the radially outer circumferential wall of the stator by a free mounting gap. In the mounted state, the ring gear of the rotor runs in this ring shaped mounting gap.

For a smooth rotational movement, the rotor ring gear can be directly supported on the iron core via a rotary bearing. For reducing the structural length of the generator, it is advantageous when the rotary bearing is arranged inside the hollow space delimited by the ring gear.

According to the invention, the ring gear is driven by means of the relative movement between the two components. It is advantageous when the relative movement is transmitted to the rotor ring gear by interposing a transmission. With the transmission, different movements can be converted into a rotational movement which is introduced into the rotor ring gear via the above mentioned drive shaft.

With regard to mounting space, it is particularly favorable when the stator of the generator is integrated in the transmission as a transmission element. This configuration results in a very small unit. In addition, the functional principle of the electric damper resulting from the above configuration is different from the state of the art because in this case, the stator is not a stationary component but is rather actively rotated itself. By using corresponding transmission ratios, the ring gear can be rotated with significantly higher rotational speeds compared to the stator. This generates an induction voltage in the generator in a manner known per se.

A particularly compact generator results when the stator as well as the rotor hollow wheel which has a smaller diameter are configured cup shaped and are nested into one another with the confronting open front sides. Such a nested arrangement advantageously results in a small overall length of the electric damper.

The first component can for example be a wheel guiding element, while the second component can be the vehicle superstructure. In this case, the wheel guiding element can be pivotally connected to the vehicle superstructure via a pivot axle. For a very compact configuration of the damper, the pivot axis can be arranged coaxial to the rotation axis and/or the stator. The wheel guiding element can be connected with the stator in a rotatively fixed manner while the stator is rotatably supported fixed on the vehicle via a rotary bearing. Owing to the above mentioned structural features, the electric damper can be configured particularly compact. The compact design of the electric dampers allows the damper to be used inside a fastening eye of the wheel guiding element.

The above mentioned configuration results in a nested construction in which the radially inner iron core and the rotor ring gear and the circumferential wall of the stator are aligned with one another in radial direction.

BRIEF DESCRIPTION OF THE DRAWING

In the following, an exemplary embodiment of the invention is explained by way of the included figures.

It is shown in:

FIG. 4 the electric damper mounted generator along a sectional plane from FIG. 3.

DETAILED DESCRIPTION OF PREFERRED EMBODIMENTS

Figure 1:
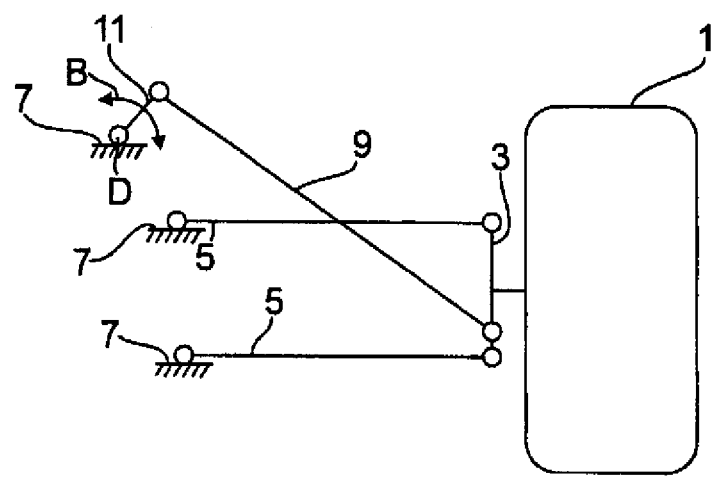
FIG. 1 a roughly schematic representation of a wheel suspension of a vehicle wheel.

FIG. 1 shows the wheel suspension of a vehicle wheel 1 of a motor vehicle. The vehicle wheel 1 is rotatably supported on a wheel carrier 3. The wheel carrier 3 is articulated to the vehicle superstructure 7 via transverse guiding arms 5. In addition, a slanted guide arm 9 which acts on the wheel carrier 3, which is connected to the vehicle superstructure 7 via a coupling rod. According to FIG. 1, the coupling rod 11 is pivotally connected with the vehicle superstructure 7 via a pivot axis D.

Figure 2:
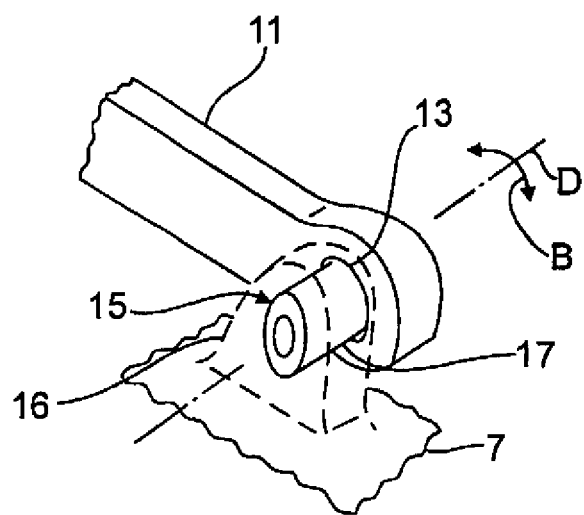
FIG. 2 a wheel guiding element with an electric damper which is used in a fastening eye.
Figure 3:
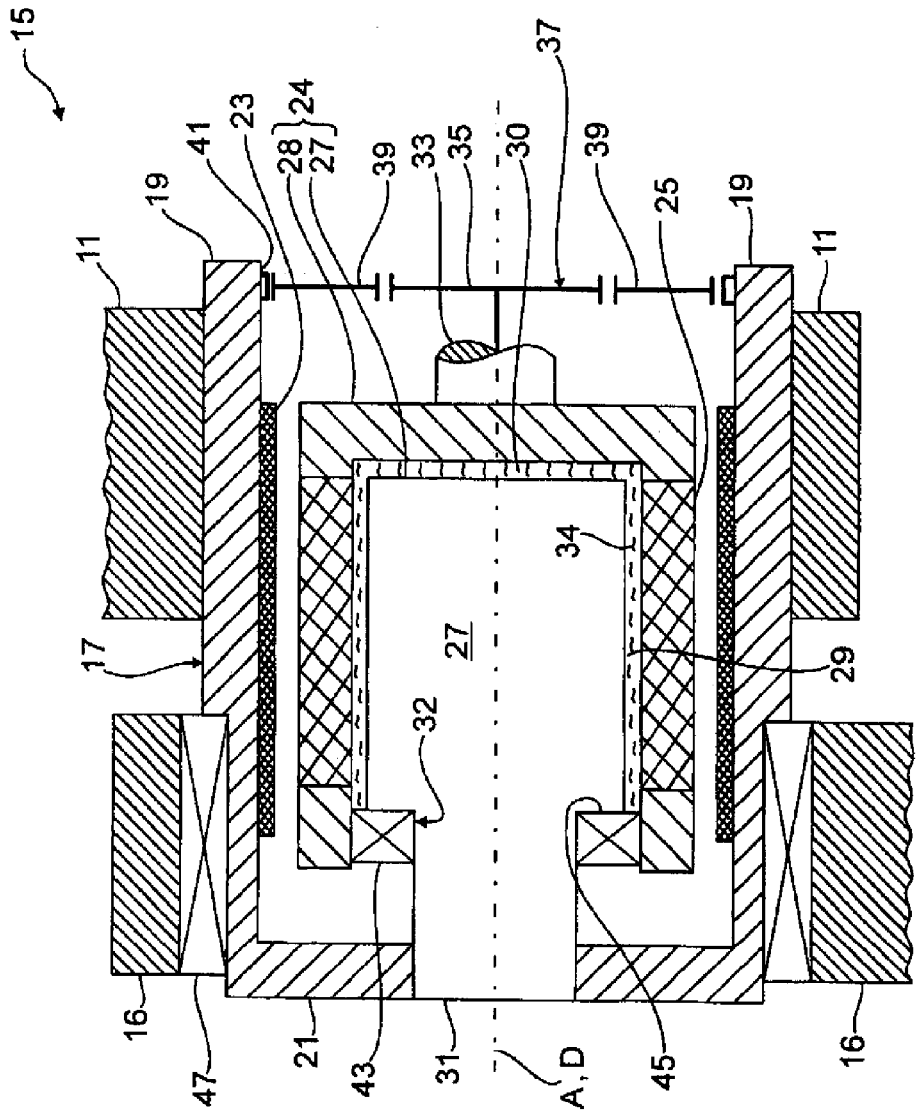
FIG. 3 in a schematic side sectional representation, the electric damper in an exemplary mounting position.

FIG. 2 shows the articulation point between the coupling rod 11 and the vehicle superstructure 7. Thus, the coupling rod 11 has a fastening eye 13. In the fastening eye 13, an electric damper 15 is inserted which is shown in more detail in the following FIGS. 3 and 4. The electric damper 15 pivotally connects the coupling rod 11 with the holding console 16 which is provided on the vehicle superstructure 7 and is indicated by hatched lines. FIG. 3 shows an enlarged representation of the articulation point of FIG. 2. In FIG. 3, the electric damper 15 has a generator which has a radially outer stator. The outer stator 17 of the generator sits in press fit rotatively fixed in the fastening eye 13 of the coupling rod 11. The stator 17 is a rotationally symmetrical, cylindrical component with a radially outer circumferential wall 19 which in FIG. 3 on the left is closed with a front-side support wall 21.

The generator in the shown exemplary embodiment is configured as an inner-pole generator, in which the induction windings which are only indicated in FIG. 3 extend on the inside of the circumferential wall 19 of the stator 17. A rotor 24 is provided radially inside the stator 17. The rotor 24 carries the electromagnets which interact with the induction windings 23 and can be activated via an excitation current.

As can be seen from FIGS. 3 and 4, the rotor has a radially outer hollow wheel 28 which carries electromagnets 25. According to FIG. 3, the iron core 27 is spaced apart from the ring gear 28 of the rotor 24 via a free radial annular gap 29 and a front-side gap 30 and extends into the hollow wheel 28 of the rotor. In the shown exemplary embodiment, these free gaps 29, 30 are filled with a highly permeable fluid 34, which on one hand increases the magnetic flow and on the other hand has a sufficiently great viscosity to support a vibration damping between the components 7, 11.

According to FIG. 3, the iron core 27 transitions into a fastening pin 31 at a step 32, which fastening pin 31 is rotatively fixed in the front-side support wall 21 of the cup shaped stator 17. The center axes of the iron core 27 and the stator 17 are configured coaxial to one another so that overall a rotationally symmetrical one-piece component formed by the stator 17 and the iron core 27 results.

According to FIG. 3 or 4, the rotor hollow wheel 28 of the rotor runs in the mounting gap located between the iron core 27 of the rotor and the circumferential wall 19 of the stator 17. The rotor hollow wheel 28 is also configured as a rotationally symmetric, cylindrical hollow body. This hollow body is configured cup shaped analogous to the stator 17 and oriented with its open side in opposite direction to the stator 17. In FIG. 3, a drive shaft 33 adjoins the closed bottom of the hollow wheel 28. According to FIG. 3, the drive shaft 33 carries a sun gear 35 of a planetary gear train 37, which drivingly connects the rotor hollow wheel 28 with the stator 17. Beside the sun gear 35, the planetary gear train 37 has planetary gears 39 which are supported by a not shown fixed planetary gear carrier. The planetary gears 39 mesh with the sun gear 35 and the not further shown inner toothing 41 which is formed on the inside of the circumferential wall 19 of the stator 17.

For a smooth rotational movement, the rotor ring gear 28 is rotatably supported on the iron core 27 with a rotary bearing 43. According to FIG. 3, the rotary bearing 43 is pushed onto the fastening pin 31 and supported on a ring shoulder 45 of the step formed in the iron core 27. According to FIG. 3, the rotary bearing 43 is space-effectively located together with the iron core 27 inside the hollow space delimited by the ring gear.

According to FIG. 3, a further rotary bearing 47 is pushed onto the stepped circumferential section of the circumferential wall of the stator 17, via which further rotary bearing 47 the holding console 16 of the vehicle superstructure 7 is rotatably connected with the stator 17 of the generator.

The generator of the electric damper 15 is configured so that the rotational axis A of the stator 17 and the rotor ring gear 28 are coaxial to the pivot axis D of the wheel guiding element 11 which is pivotally connected to the vehicle superstructure 7.

The invention claimed is:

1. An electric damper for a vehicle for damping a movement of two components of the vehicle relative to each other, comprising:
    an electrical generator, said electrical generator comprising
        a stator, having a first end connected in rotative fixed relationship with a first component of the vehicle, said stator having a second end supported on a second component of the vehicle for rotation of the stator relative to the second component,
        a rotor having a hollow wheel received in the stator,
        an iron core supported on an end wall of the stator and extending into the hollow wheel of the rotor, and
        a transmission which couples the stator with the rotor and transmits a rotation of the stator caused by a movement of the first and second components relative to each other to the rotor.

2. The electric damper of claim 1, wherein the generator is an inner-pole generator in which the stator carries the induction windings and the hollow wheel of the rotor carries the field magnets.

3. The electric damper of claim 1, wherein the iron core is spaced apart from the hollow wheel of the rotor by a free gap.

4. The electric damper of claim 3, wherein the free gap between the hollow wheel of the rotor and the stationary iron core is an air gap or is filled with a highly permeable fluid.

5. The electric damper of claim 1, wherein the field magnets are configured as permanent magnets or as electromagnets which are activated with an exciting current.

6. The electric damper of claim 1, wherein the hollow wheel is cup shaped.

7. The electric damper of claim 1, wherein the stator together with the iron core forms a one-piece component.

8. The electric damper of claim 1, further comprising a rotary bearing, wherein the hollow wheel is supported on the iron core via the rotary bearing.

9. The electric damper of claim 8, wherein the rotary bearing is arranged in a hollow space of the rotor hollow wheel.

10. The electric damper of claim 1, wherein the first and second components are pivotally connected to one another via a pivot axis.

11. The electric damper of claim 10, wherein the pivot axis is arranged coaxial to the rotation axis of the rotor and the stator.

12. The electric damper of claim 10, wherein the first component has a fastening eye, and wherein the generator is inserted into the fastening eye.

13. The electric damper of claim 1, wherein the first component is constructed as a coupling arm or control arm inserted into a wheel suspension of the vehicle.

14. The electric damper of claim 1, wherein the first component has a fastening eye, and wherein the generator is inserted into the fastening eye.

* * * * *